(12) United States Patent
Kondo et al.

(10) Patent No.: US 10,953,941 B2
(45) Date of Patent: Mar. 23, 2021

(54) STRADDLE TYPE VEHICLE

(71) Applicants: Suzuki Motor Corporation, Shizuoka (JP); Teijin Limited, Osaka (JP)

(72) Inventors: Naokazu Kondo, Shizuoka-ken (JP); Masayasu Wakabayashi, Shizuoka-ken (JP); Toshiharu Kanamori, Shizuoka-ken (JP); Takahisa Egawa, Shizuoka-ken (JP); Masahiro Kitagawa, Osaka (JP); Masatomo Teshima, Osaka (JP)

(73) Assignees: SUZUKI MOTOR CORPORATION; Teijin Limited

( * ) Notice: Subject to any disclaimer, the term of this patent is extended or adjusted under 35 U.S.C. 154(b) by 182 days.

(21) Appl. No.: 15/987,239

(22) Filed: May 23, 2018

(65) Prior Publication Data

US 2018/0339739 A1    Nov. 29, 2018

(30) Foreign Application Priority Data

May 26, 2017  (JP) .............................. JP2017-104716

(51) Int. Cl.
  *B62J 1/08*    (2006.01)
  *B62J 25/00*   (2020.01)
  (Continued)

(52) U.S. Cl.
  CPC ................ *B62J 1/08* (2013.01); *B62J 25/00* (2013.01); *B62K 11/02* (2013.01); *B62K 19/16* (2013.01); *B62J 1/12* (2013.01)

(58) Field of Classification Search
  CPC ..... B62J 1/08; B62J 25/00; B62J 1/12; B62K 11/02; B62K 19/16

(Continued)

(56) References Cited

U.S. PATENT DOCUMENTS

| 7,905,506 B2 | 3/2011 | Ishikawa et al. |
| 2008/0017431 A1* | 1/2008 | Sadakuni ............... B62D 55/07 180/193 |
| 2009/0230654 A1 | 9/2009 | Yuliang et al. |

FOREIGN PATENT DOCUMENTS

| JP | S5849581 A | 3/1983 |
| JP | H01111592 A | 4/1989 |

(Continued)

OTHER PUBLICATIONS

Japanese Office Action for Application No. 2017-104716, dated Aug. 18, 2020, 2 pages.

*Primary Examiner* — Kevin Hurley
*Assistant Examiner* — Felicia L. Brittman
(74) *Attorney, Agent, or Firm* — Lerner, David, Littenberg, Krumholz & Mentlik, LLP

(57) ABSTRACT

Disclosed herein is a straddle type vehicle that uses resin seat rails, and in which attachment parts of footrests for an occupant of a rear seat of a tandem seat are provided to fastening parts of a member connecting right and left seat rails. The straddle type vehicle may include: resin right and left seat rails extending in a vehicle longitudinal direction; a middle connection member connecting the seat rails to each other; a tandem seat assembled to the seat rails and footrests for an occupant of the tandem seat respectively coupled to the right and left seat rails. A connection part of the middle connection member of the seat rails is provided within a range obtained by vertically extending an outer edge of an attachment part of the footrest coupled to each of the seat rails in side view.

7 Claims, 5 Drawing Sheets

(51) Int. Cl.
*B62K 11/02* (2006.01)
*B62K 19/16* (2006.01)
*B62J 1/12* (2006.01)

(58) Field of Classification Search
USPC .......................................................... 280/291
See application file for complete search history.

(56) References Cited

FOREIGN PATENT DOCUMENTS

| | | | |
|---|---|---|---|
| JP | H09150770 A | 6/1997 |
| JP | 2009214717 A | 9/2009 |
| JP | 2013226977 A | 11/2013 |

* cited by examiner

STRADDLE TYPE VEHICLE

CROSS-REFERENCE TO RELATED APPLICATIONS

This application claims priority from Japanese Patent Application No. 2017-104716, filed May 26, 2017, the disclosure of which is hereby incorporated herein by reference.

BACKGROUND OF THE INVENTION

The present invention relates to a straddle type vehicle such as a motorcycle that adopts a rear frame in which resin seat rails are mutually connected by a connection member, and to a straddle type vehicle in which a load applied on the seat rails from footrests for an occupant riding behind a driver can be distributed to the connection member to reduce the load on the seat rails.

Japanese Patent Publication No. JP S58-49581 ("the '581 Publication") discloses a motorcycle that uses synthetic resin for a rear frame. However, the '581 Publication does not clarify whether the synthetic resin rear frame is a structure that can withstand a large load applied thereon from an occupant or luggage when running on a bad road, for example.

BRIEF SUMMARY OF THE INVENTION

When a rear frame is created from a strong metal material such as stiff aluminum or iron to withstand a large load applied thereon from an occupant or luggage when running on a bad road, this causes a problem of increase in weight.

The present invention aims to provide a straddle type vehicle that uses resin seat rails, and in which attachment parts of footrests for an occupant of a rear seat of a tandem seat are provided to fastening parts of a member connecting right and left seat rails. This allows a load on the footrests to be distributed to the connection member of the seat rails, so that the load on the seat rails can be reduced, and the thickness of the seat rails can be reduced to reduce the weight of the rear frame.

To solve the problem, the present invention includes: resin right and left seat rails extending in a vehicle longitudinal direction; a connection member connecting the seat rails to each other; a tandem seat assembled to the seat rails; and footrests for an occupant of the tandem seat respectively coupled to the right and left seat rails. A connection part of the connection member of the seat rails is provided within a range obtained by vertically extending an outer edge of an attachment part of the footrest coupled to the seat rail, in side view.

When a downward load of an occupant is applied on the footrests for the occupant, the input load on the seat rails can be received by the connection member. Since the load on the seat rails can thus be reduced, the thickness of the seat rail can be reduced even more to reduce the weight of the rear frame.

DETAILED DESCRIPTION

Hereinafter, an embodiment of the present invention will be described in detail with reference to drawings illustrated in FIGS. 1 to 8.

Figure 1:
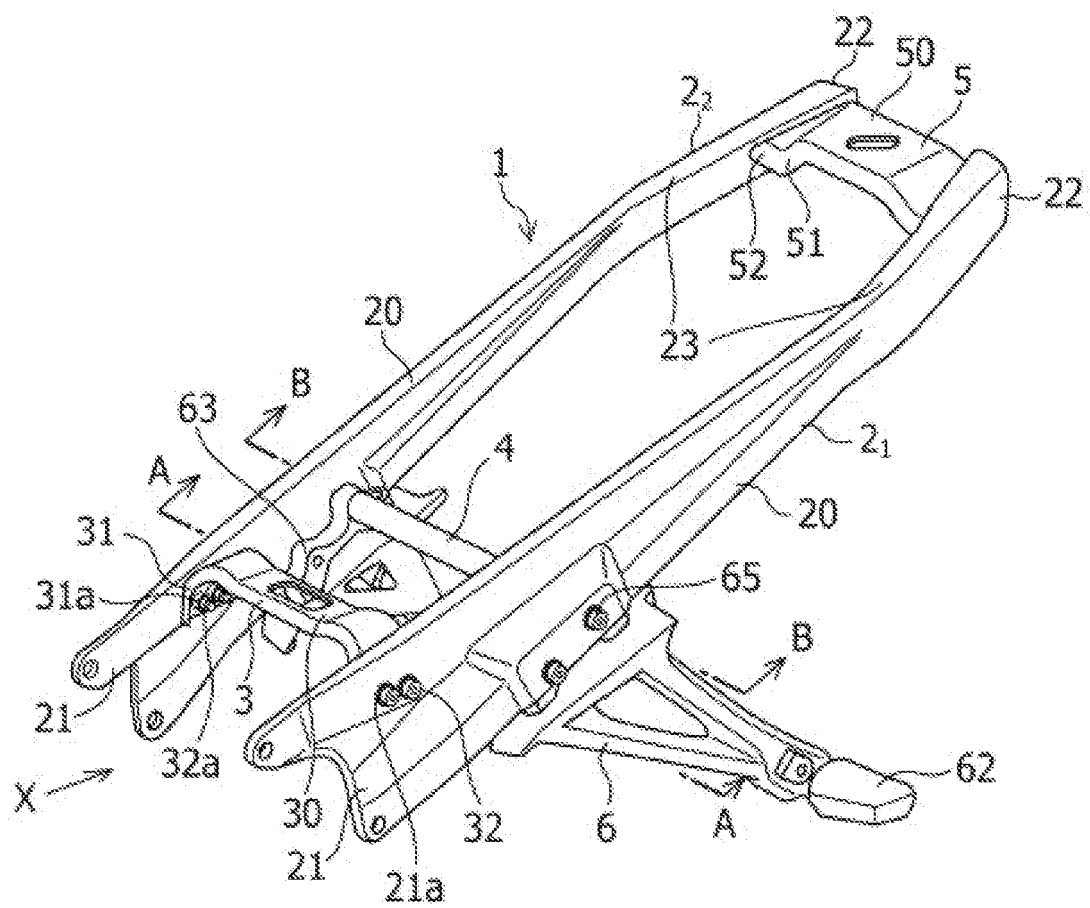
FIG. 1 is a perspective view of a resin rear frame of an embodiment of a straddle type vehicle of the present invention, as viewed from the front upper direction.
Figure 2:
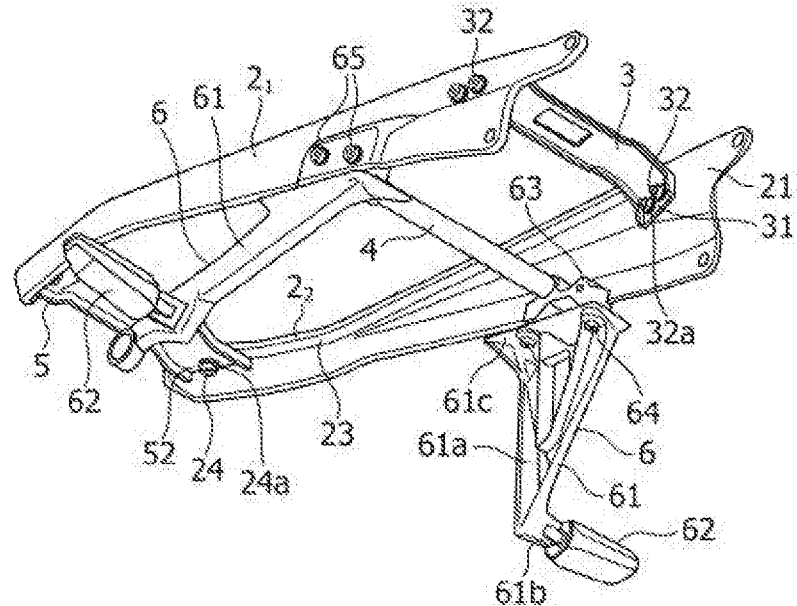
FIG. 2 is a perspective view of the resin rear frame of FIG. 1, as viewed from a rear lower direction X.

FIGS. 1 and 2 illustrate a synthetic resin rear frame of a motorcycle, which is connected to the rear of a front frame constituting a front part of the motorcycle, and to which a tandem seat where an occupant sits is assembled.

In FIGS. 1 and 2, a rear frame 1 is configured of a pair of seat rails $2_1$, $2_2$ whose front ends are each assembled to the unillustrated front frame, a front connection member 3 that connects the seat rails $2_1$, $2_2$ to each other arranged on the right and left of the vehicle, a middle connection member 4, and a rear-end connection member 5. An unillustrated tandem seat that the occupant straddles is assembled to the rear frame 1, on the upper end, and the tandem seat is formed long in the longitudinal direction to allow a driver and an occupant to ride thereon. Meanwhile, each of the pair of seat rails $2_1$, $2_2$ is provided with a footrest 6 to allow the occupant to place a foot thereon.

The pair of seat rails $2_1$, $2_2$ are arranged at a predetermined distance from each other in a rear upper part of the motorcycle in the longitudinal direction of the vehicle body, and are each formed into a thin resin plate 20 by resin molding such as injection molding. A front end portion 21 of the resin plate 20 is formed in such a manner as to spread vertically into a fan shape. While it is preferable that the seat rails $2_1$, $2_2$ use thermoplastic CFRP (carbon fiber reinforced plastic) as the material thereof, thermosetting CFRP may be used instead. The fiber may be aramid fiber, for example, instead of glass fiber.

The front connection member 3 is created by bending both end parts of a strip-shaped plate 30 at a right angle to form a U shape, and screw holes 31a are formed in flange portions 31 on both sides of the U shape. Meanwhile, screw holes 21a are formed in the vehicle width direction in front end portions 21 of the resin plates 20 of the seat rails $2_1$, $2_2$. The front end parts of the seat rails $2_1$, $2_2$ are fastened to each other at a certain distance, by inserting a screw 32 into the screw hole 21a and the screw hole 31a in the flange portion 31, and fastening it with a nut 32a.

Additionally, the rear-end connection member 5 is created by forming a stepped portion 51 in both end parts of a strip-shaped plate 50, and a screw hole 52a is formed in a flange portion 52 on the tip of the stepped portion 51. Meanwhile, a flange portion 23 bent inward in the vehicle width direction is formed toward a rear end portion 22 at the upper end of the resin plate 20 of each of the seat rails $2_1$, $2_2$. A screw shaft 24 is provided vertically on the lower face side of the rear end part of the flange portion 23. The screw shaft 24 is inserted through the screw hole 52a in the flange portion 52, and is fixed by a nut 24*a*. Thus, rear end parts of the seat rails $2_1$, $2_2$ are fastened to each other at a certain distance.

Figure 3:
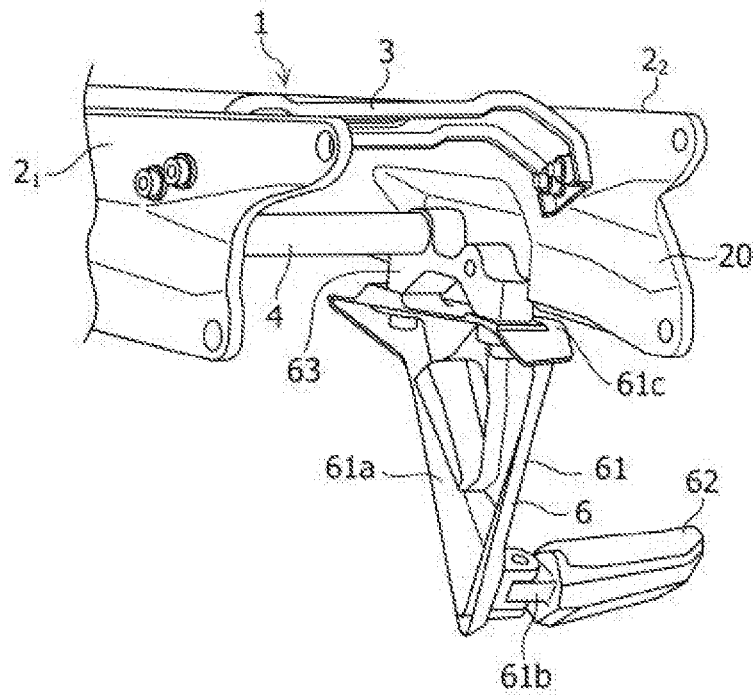
FIG. 3 is an enlarged perspective view of a footrest attachment part of FIG. 2.
Figure 4:
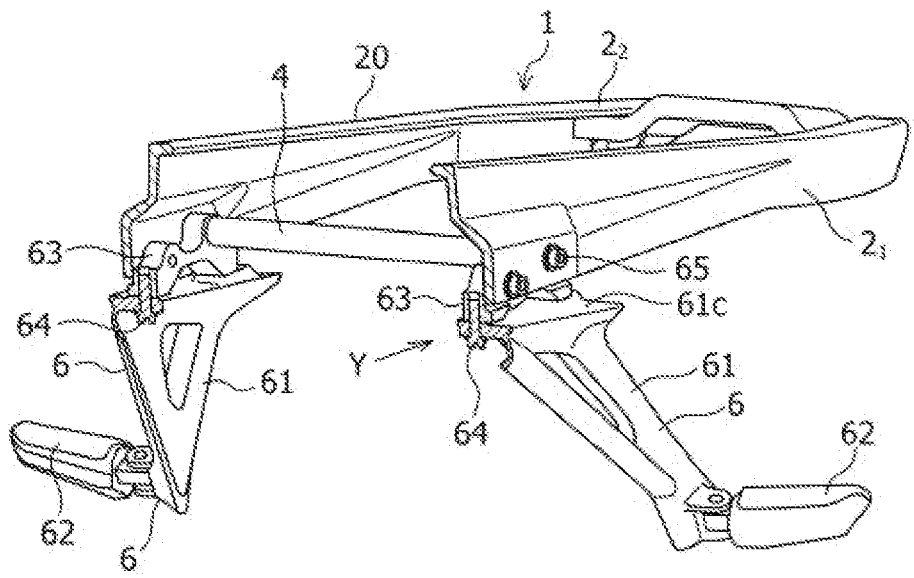
FIG. 4 is a perspective view illustrating a partial section cut along line A-A of FIG. 1.
Figure 5:
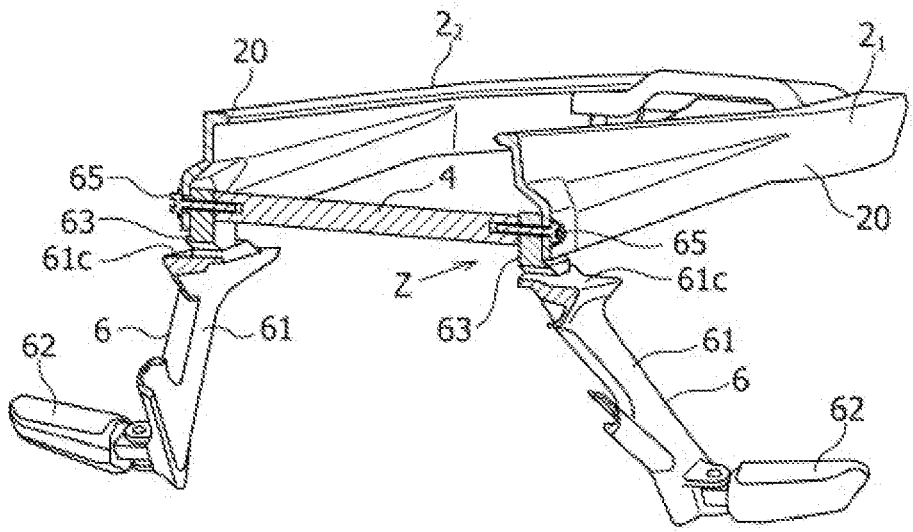
FIG. 5 is a perspective view illustrating a partial section cut along line B-B of FIG. 1.

Meanwhile, the middle connection member 4 connects the seat rails $2_1$, $2_2$ to each other behind the front connection member 3. The middle connection member 4 is attached to the seat rails $2_1$, $2_2$, through the right and left footrests 6 that are respectively attached to the resin plates 20 of the seat rails $2_1$, $2_2$. As illustrated in FIGS. 3 to 5, the footrest 6 is configured of a footrest main body 61 formed into a triangular shape, a pedal 62 attached toward the outer side of the vehicle body on a lower end part of the footrest main body 61, and a footrest bracket portion 63 as an attachment part attached to the upper end of the footrest main body 61. The middle connection member 4 is a cylindrical member formed of aluminum, and may use thermoplastic CFRP (carbon fiber reinforced plastic) or thermosetting CFRP, as in the case of the resin plates 20 of the seat rails $2_1$, $2_2$.

Figure 6:
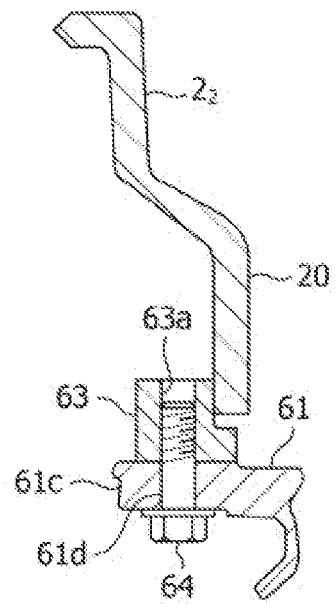
FIG. 6 is a cross-sectional view illustrating an enlarged section as viewed in direction Y of FIG. 4.

The footrest main body 61 has a frame portion 61*a* made of aluminum and formed into an inverted triangle, and also has, in a lower end part thereof, a supporting portion 61*b* supporting the pedal 62 and extending toward the outer side of the vehicle body. A flange portion 61*c* extends toward the inner side of the vehicle body from the upper end of the frame portion 61*a*. As illustrated in FIG. 6, the footrest bracket portion 63 is screwed and fixed by a screw 64, through a through hole 61*d* formed in the flange portion 61*c*.

A vertical screw hole 63*a* is formed in a lower face of the footrest bracket portion 63, and the footrest main body 61 and the footrest bracket portion 63 are fastened integrally by screwing the screw 64 into the screw hole 63*a*.

Figure 7:
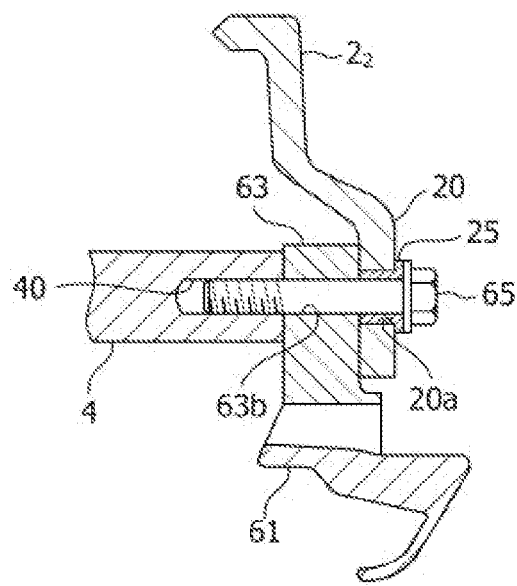
FIG. 7 is a cross-sectional view illustrating an enlarged section as viewed in direction Z of FIG. 5.

As illustrated in FIG. 7, a through hole 63*b* is formed in the vehicle width direction in an upper end part of the footrest bracket portion 63. The middle connection member 4 and the footrest main body 61 are concurrently fastened to the resin plate 20 of each of the seat rails $2_1$, $2_2$, by inserting, through the through hole 63*b*, a screw 65 inserted into a hole 20*a* formed in the resin plate 20 of each of the seat rails $2_1$, $2_2$, and screwing the screw 65 into a screw hole 40 formed in the axial direction in an end face of the middle connection member 4. A reference sign 25 denotes a cylindrical collar fitted into the hole 20*a* formed in the resin plate 20.

In a motorcycle, a driver and an occupant straddle and ride the rear frame 1 to which a tandem seat is assembled. The occupant straddling behind the driver rides by placing the feet on the pedals 62 of the footrests 6 attached to the seat rails $2_1$, $2_2$. A load of the occupant applied on the pedals 62 is transmitted from the footrest main bodies 61 to the footrest bracket portions 63 on the upper side, and is transmitted to the resin plates 20 of the seat rails $2_1$, $2_2$ and the middle connection member 4. The load transmitted to the resin plates 20 is also distributed to the front connection member 3 and the rear-end connection member 5, in addition to the middle connection member 4, to prevent concentration of load in the seat rails $2_1$, $2_2$. Since concentration of load in the seat rails $2_1$, $2_2$ can thus be prevented, the thickness of the resin plates 20 of the seat rails $2_1$, $2_2$ can be reduced to reduce the weight of the vehicle body.

In the embodiment, in side view, the resin plate 20 of each of the seat rails $2_1$, $2_2$ and the footrest bracket portion 63 are placed overlappingly, the screw 65 is inserted into the hole 20*a* formed in the resin plate 20 of each of the seat rails $2_1$, $2_2$, and the screw 65 is inserted through the through hole 63*b* in the footrest bracket portion 63 and is screwed into the screw hole 40 formed in the end face of the middle connection member 4. Thus, the middle connection member 4 is fastened to the resin plate 20 of each of the seat rails $2_1$, $2_2$ together with the footrest main body 61. Since the middle connection member 4 is connected within the area of the footrest bracket portion 63, the load from the footrest main body 61 can be transmitted to the resin plates 20 of the seat rails $2_1$, $2_2$ and the middle connection member 4, through the footrest bracket portion 63.

Figure 8:
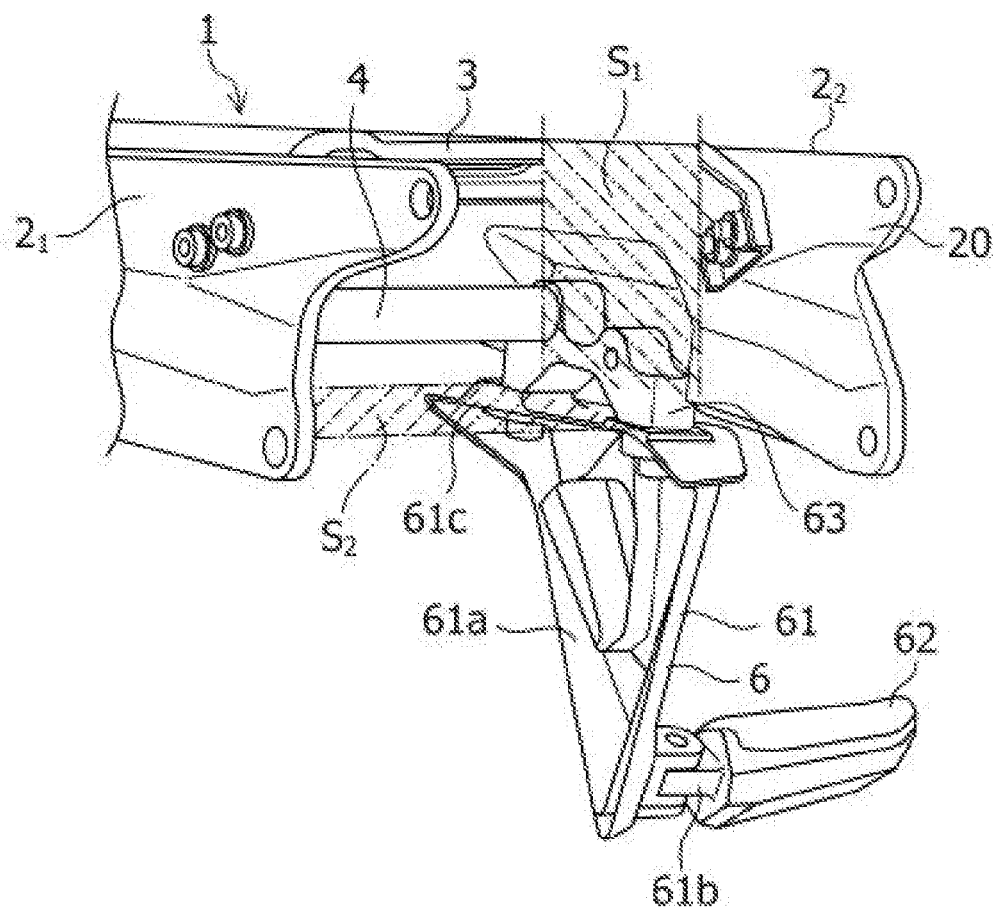
FIG. 8 is a perspective view illustrating attachment areas on a vertical plane and a horizontal plane of a connection member attached to a seat rail.

FIG. 8 illustrates a variation of the attachment position of the middle connection member 4. A resin plate 20 of each of seat rails $2_1$, $2_2$ and a middle connection member 4 may be connected within a range obtained by vertically extending an outer edge of an overlapping part of a footrest bracket portion 63 and the resin plate 20 of each of the seat rails $2_1$, $2_2$, in side view of the vehicle body. The load can be effectively distributed and received, even if the middle connection member 4 is connected within an area $S_1$ indicated by a broken line in FIG. 8. In this case, a rear frame 1 may be formed by integrally molding the seat rails $2_1$, $2_2$ and the middle connection member 4 in advance by injection molding, for example.

Since the middle connection member 4 is connected within the area of the footrest bracket portion 63, the load from a footrest main body 61 can be transmitted to the resin plates 20 of the seat rails $2_1$, $2_2$ and the middle connection member 4 through the footrest bracket portion 63. Hence, the input load can be received by the middle connection member 4, so that the thickness of the seat rails $2_1$, $2_2$ can be reduced to reduce weight.

In this case, although the footrest 6 of the embodiment is formed by producing the footrest main body 61 and the footrest bracket portion 63 as separate bodies and then assembling them as one body, the parts may be molded integrally by resin molding or from aluminum.

Additionally, the middle connection member 4 connecting the seat rails $2_1$, $2_2$ may be provided in the vehicle width direction, within a range $S_2$ obtained by horizontally extending an outer edge of an overlapping part of each of the seat rails $2_1$, $2_2$ and the footrest bracket portion 63 in side view, illustrated in FIG. 8. In this case, too, the input load can be received by the middle connection member 4, so that the thickness of the seat rails $2_1$, $2_2$ can be reduced to reduce weight.

Moreover, the footrest bracket portion 63 (bracket) is provided integrally with the upper end part of the footrest main body 61 (footrest), the footrest main body 61 (footrest) is attached to each of the seat rails $2_1$, $2_2$ through the footrest bracket portion 63 (bracket), and a connection part of the middle connection member 4 (connection member) connecting the seat rails $2_1$, $2_2$ to each other can be provided on the inner side of the outer edge of the footrest bracket portion 63 (bracket).

A connection part of the seat rails $2_1$, $2_2$ and the footrest 6 (footrest bracket portion 63) may at least partially overlap a connection part of the middle connection member 4 and the footrest 6 (footrest bracket portion 63) in side view. In this case, too, the input load can be received by the middle connection member 4, so that the thickness of the seat rails $2_1$, $2_2$ can be reduced to reduce weight. Even if an input load from an occupant or luggage is applied on the rear of the seat rails $2_1$, $2_2$, deformation of the seat rails $2_1$, $2_2$ in the vehicle width direction can be minimized, whereby damage of the seat rails $2_1$, $2_2$ can be suppressed even with maximum load. Hence, the thickness of the seat rails $2_1$, $2_2$ can be reduced even more, to further reduce the weight.

Similarly, a connection part of the seat rails $2_1$, $2_2$ and the footrest bracket portion 63 may at least partially overlap a connection part of the middle connection member 4 and the footrest bracket portion 63 in side view. In this case, too, the input load can be received by the middle connection member 4, so that the thickness of the seat rails $2_1$, $2_2$ can be reduced to reduce weight. It is more preferable that the connection part of the seat rails $2_1$, $2_2$ and the footrest bracket portion 63 coincide with the connection part of the middle connection member 4 and the footrest bracket portion 63 in side view.

The present invention is not limited to the embodiment, and the seat rails $2_1$, $2_2$ and the middle connection member 4 may be separate parts as in the case of the embodiment, or may be molded integrally by injection molding, for example. Although the seat rails $2_1$, $2_2$ are formed of synthetic resin, other materials may be used as long as they are light and stiff. While CFRP (carbon fiber reinforced plastic) is used in the embodiment, thermoplastic CFRP may preferably be used. Also, while aluminum is used for the middle connection member 4, thermoplastic CFRP (carbon fiber reinforced plastic) or thermosetting CFRP may be used instead.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

REFERENCE SIGNS LIST 1 rear frame
$2_1$, $2_2$ seat rail
3 front connection member
4 middle connection member
5 rear-end connection member
6 footrest
20 resin plate
21 front end portion
22 rear end portion
23 flange portion
24 screw shaft
25 collar
30 strip-shaped plate
31 flange portion
32 screw
40 screw hole
51 stepped portion
52 flange portion
61 footrest main body
61a frame portion
61b supporting portion
61c flange portion
61d through hole
62 pedal
63 footrest bracket portion
63a screw hole
63b through hole
64 screw
65 screw

The invention claimed is:

1. A straddle vehicle comprising:
resin right and left seat rails extending in a vehicle longitudinal direction;
a connection member connecting the seat rails to each other;
a tandem seat assembled to the seat rails; and
footrests for an occupant of the tandem seat respectively coupled to the right and left seat rails, wherein
a connection part of the connection member of the seat rails is provided within a range obtained by vertically extending an outer edge of an overlapping part of each of the seat rails and a footrest bracket portion of each footrest coupled to a respective seat rail, in side view.

2. The straddle vehicle according to claim 1, wherein the connection member of the seat rails is provided in a vehicle width direction, within a range obtained by horizontally extending an outer edge of an overlapping part of each seat rail and each footrest, in side view.

3. The straddle vehicle according to claim 2, wherein each footrest bracket portion is provided integrally with an upper end part of each footrest, each footrest being attached to the respective seat rail through the footrest bracket portion, and a connection part of each connection member connecting the seat rails to each other being provided on the inner side of an outer edge of each footrest bracket portion, in side view.

4. The straddle vehicle according to claim 3, wherein a connection part of each seat rail and each footrest bracket portion at least partially overlaps a connection part of each connection member and the footrest bracket portion, in side view.

5. The straddle vehicle according to claim 1, wherein each footrest bracket portion is provided integrally with an upper end part of each footrest, the footrest being attached to the respective seat rail through the footrest bracket portion, and a connection part of each connection member connecting the seat rails to each other being provided on the inner side of an outer edge of each footrest bracket portion, in side view.

6. The straddle vehicle according to claim 5, wherein a connection part of each seat rail and each footrest bracket portion at least partially overlaps a connection part of each connection member and the footrest bracket portion, in side view.

7. The straddle vehicle according to claim 1, wherein a connection part of the seat rail and the footrest at least partially overlaps a connection part of the connection member and the footrest, in side view.

* * * * *